United States Patent
Ohtsuki et al.

(10) Patent No.: US 8,790,017 B2
(45) Date of Patent: Jul. 29, 2014

(54) WHEEL BEARING APPARATUS

(71) Applicant: NTN Corporation, Osaka (JP)

(72) Inventors: Hisashi Ohtsuki, Iwata (JP); Natsuko Nagai, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/626,080

(22) Filed: Sep. 25, 2012

(65) Prior Publication Data

US 2013/0044972 A1    Feb. 21, 2013

Related U.S. Application Data (63) Continuation of application No. PCT/JP2011/057435, filed on Mar. 25, 2011.

(30) Foreign Application Priority Data

Mar. 26, 2010    (JP) .................................. 2010-071641

(51) Int. Cl.
   *F16C 19/18*    (2006.01)
   *F16C 33/78*    (2006.01)

(52) U.S. Cl.
   USPC .......................................... 384/544; 384/489

(58) Field of Classification Search
   USPC .................................. 384/544, 589, 489, 448
   See application file for complete search history.

(56) References Cited

U.S. PATENT DOCUMENTS

| | | | | |
|---|---|---|---|---|
| 2,757,052 | A | * | 7/1956 | Spurgeon ...................... 384/489 |
| 4,875,786 | A | * | 10/1989 | DeWachter ................... 384/482 |
| 5,380,103 | A | * | 1/1995 | Lederman ..................... 384/489 |
| 2007/0217728 | A1 | | 9/2007 | Kashiwagi et al. |
| 2009/0123101 | A1 | | 5/2009 | Masuda |
| 2011/0181101 | A1 | * | 7/2011 | Sicilia et al. .................. 384/489 |

FOREIGN PATENT DOCUMENTS

| | | |
|---|---|---|
| JP | 2002-172912 | 6/2002 |
| JP | 2005-104260 | 4/2005 |
| JP | 2006-258427 | 9/2006 |
| JP | 2006-308396 | 11/2006 |
| JP | 2006-329663 | 12/2006 |
| JP | 2008-232402 | 10/2008 |
| JP | 2009-115257 | 5/2009 |
| WO | WO2006/035836 | 4/2006 |

* cited by examiner

*Primary Examiner* — Thomas R Hannon
(74) *Attorney, Agent, or Firm* — Harness, Dickey & Pierce, P.L.C.

(57) ABSTRACT

A wheel bearing apparatus has a cylindrical pilot portion adapted to be fit into a knuckle. The pilot portion has a first guiding portion and a second guiding portion. A fitting width (A) of the first guiding portion with the knuckle is set larger than a fitting width (B) of the second guiding portion with the knuckle (A>B). An outer diameter D1 of the first guiding portion is set smaller than an outer diameter D2 of the second guiding portion (D1<D2). A seal ring, in elastic contact with the inner circumference of the knuckle, is arranged on either one of the first or second guiding portions.

16 Claims, 9 Drawing Sheets

PRIOR ART

WHEEL BEARING APPARATUS

CROSS-REFERENCE TO RELATED APPLICATIONS

This application is a continuation of International Application No. PCT/JP2011/057435, filed Mar. 25, 2011, which claims priority to Japanese Application No. 2010-071641, filed Mar. 26, 2010. The disclosures of the above applications are incorporating herein by reference.

FIELD

The present disclosure generally relates to a wheel bearing apparatus that rotationally supports a wheel of a vehicle, such as an automobile and, more particularly, to a wheel bearing apparatus intended to improve its durability while preventing entry of rain water etc. into the fitting portion to a knuckle of the vehicle.

BACKGROUND

The power transmitting apparatus of a vehicle, such as an automobile, is required not only to perform transmission of engine power of the automobile to the wheels but also to permit radial, axial and moment displacement from the wheels caused during bounds in rough road running or turning of the vehicle. Accordingly, one end of a drive shaft, interposed between an engine side and a driving wheel side, is connected to a differential gear via a constant velocity universal joint of the sliding type. The other end is connected to driving wheels via a wheel bearing apparatus including a fixed type constant velocity universal joint. In addition, components not required to transmit the power to the wheels are connected to driven wheels via the wheel bearing apparatus.

The wheel bearing apparatus is usually fit into a knuckle forming part of the suspension apparatus. The knuckle is formed with mounting portions, to secure the wheel bearing apparatus, and openings, for passing rotational members such as the drive shaft and constant velocity universal joint. Rain water, etc. enters into the fitting surfaces between the knuckle and the wheel bearing apparatus through annular spaces formed between the rotational members and the knuckle. In addition, rain water etc. enters into the inside of the wheel bearing apparatus through its securing portions in the knuckle which forms a closing lid for the wheel bearing apparatus.

Seals are mounted between the outer and inner members of the wheel bearing apparatus to prevent rain water etc. from entering into the wheel bearing apparatus. However, it is impossible to prevent the entry of rain water etc. through the fitting portion between the knuckle and the outer member fit into the knuckle. Accordingly, rust is sometimes generated in the fitting portion between the knuckle and the outer member. Thus, removal of the wheel bearing apparatus from the knuckle becomes difficult. In addition to this problem, it is necessary to add a new seal in the knuckle of the closing lid type knuckle and thus the number of parts is increased.

Furthermore, when using a knuckle of an aluminum alloy to reduce its weight, electric corrosion is generated by rain water etc. that enters into the fitting portion between the steel knuckle and the aluminum alloy outer member. Thus, it is necessary to surely prevent entry of rain water etc. into the fitting portion between the knuckle and the outer member.

Figure 10:
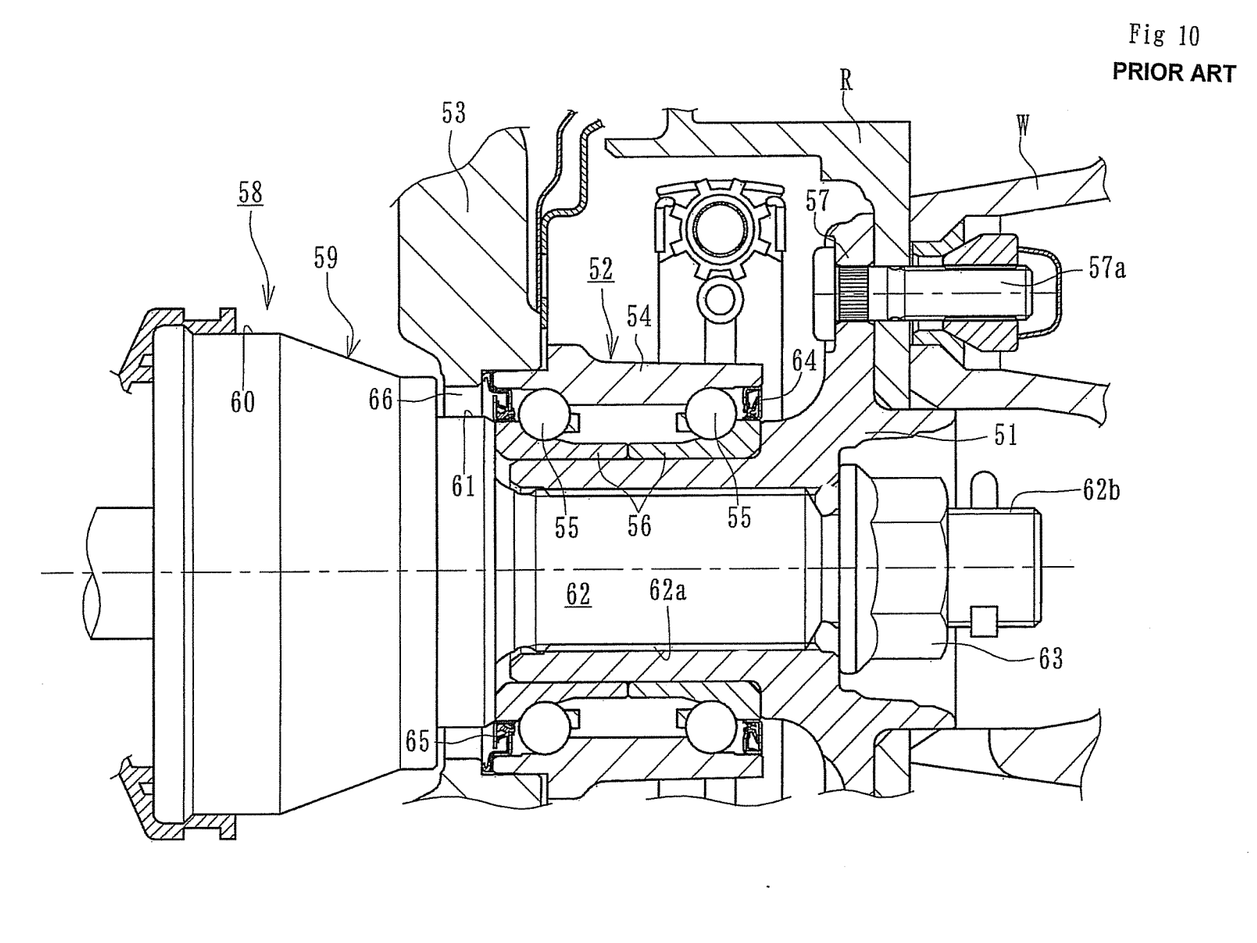
FIG. 10 is a longitudinal-section view of a wheel supporting structure with a prior art wheel bearing apparatus.

A device for solving such a problem is shown in FIG. 10. The wheel bearing apparatus includes a wheel hub 51 and a wheel bearing 52 fit into the wheel hub 51. The wheel bearing 52 has an outer member 54 fit into an aluminum alloy knuckle 53. A pair of inner rings 56 is inserted into the outer member 54 via double row balls 55, 55. The wheel hub 51 has, on its one end, a wheel mounting flange 57 with hub bolts 57a mounted equidistantly along its outer circumference. A wheel W is mounted thereto via a brake rotor R.

A constant velocity universal joint 58 includes an outer joint member 59, a joint inner ring (not shown), a cage, and torque transmitting balls. The outer joint member 59 is formed with an integrated body including a cup-shaped mouth portion 60, a shoulder portion 61, forming a bottom of the mouth portion 60, and a stem portion 62 axially extending from the shoulder portion 61. The stem portion 62 is formed with a serration 62a on its outer circumference. An external thread 62b is at the end of the serration 62a. The wheel hub 51 and the outer joint member 59 are detachably united by a securing nut 63. The end face of the inner ring 56 abuts against the shoulder portion 61 of the outer joint member 59.

Seals 64, 65 are mounted in an annular space opening formed between the outer member 54 and the inner ring 56. The seals 64, 65 prevent leakage of grease sealed in the wheel bearing and the entry of rain water, dust etc. into the inside of the wheel bearing from the outside.

Figure 11:
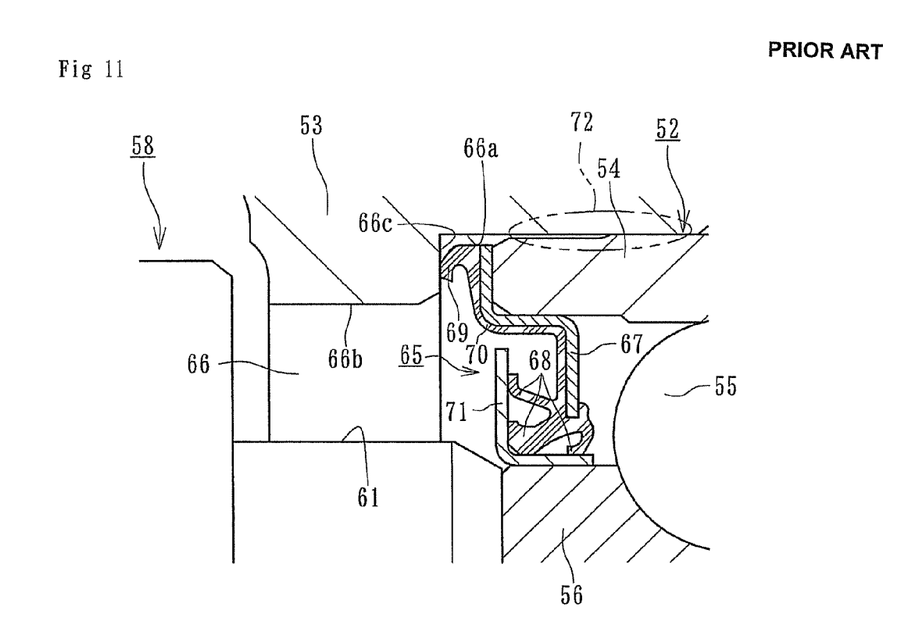
FIG. 11 is a partially enlarged view of FIG. 10.

As shown in a partially enlarged view of FIG. 11, a knuckle opening 66 has a larger inner circumference 66a, a smaller inner circumference 66b, and a stepped surface 66c. The small inner circumference 66b has an inner diameter slightly smaller than that of the larger inner circumference 66a. The stepped surface 66c is positioned between the larger and smaller inner circumferences 66a, 66b. The seal 65 includes a metal core 67, a first seal portion 68, a second seal portion 69, a cover portion 70, and a slinger 71.

The metal core 67 is adapted to be press-fit into the inner circumference of the end of the outer member 54. The metal core 67 radially inner end extends toward the outer circumference of the inner ring 56. The first seal portion 68 is formed of non-conductive material such as synthetic rubber etc. and has three sealing lips that extend in three directions so as to be in sliding contact with the slinger 71. The slinger 72 is press-fit onto the outer circumference of the inner ring 56. The second seal portion 69 is formed of non-conductive material such as synthetic rubber etc. The second seal portion 69 has a packing-like sealing lip adapted to be press-contacted to the stepped surface 66c in the opening 66 of the knuckle 53. The cover portion 70 is formed of non-conductive material such as synthetic rubber and covers the metal core 67 between the first seal portion 68 and the second seal portion 69.

Rain water etc. splashed between a space between the knuckle 53 and the constant velocity universal joint 58, during running of a vehicle, would enter through the opening 66 of the knuckle 53 into an opening between the outer member 54 and the inner ring 56 and into a gap in the fitting portion 72 between the outer member 54 and the knuckle 53.

Under these circumstances, the entry of rain water etc. into the inside of the wheel bearing can be prevented by closure of the opening between the outer member 54 and the inner ring 56 due to cooperation of the first seal portion 68 and the slinger 71.

In addition, the entry of rain water etc. into the gap in the fitting portion 72 between the outer member 54 and the knuckle 53 can also be prevented by closure of the space between the outer member 54 and the knuckle 53 due to cooperation of the second seal portion 69 and the stepped surface 66c of the knuckle 53. Thus, the generation of electric corrosion in the fitting portion 72 between the knuckle 53 and the outer member 54 can be surely prevented without adding seals and increasing the number of components. See, Japanese Laid-open Patent Publication No. 172912/2002.

In such a prior art wheel bearing apparatus, the packing-like sealing lip of the second seal portion 69 is formed with a projected outline to be press-contacted with the stepped surface 66c of the knuckle 53. Thus, it tends to be in contact with other components. Specifically, it is damaged during assembling steps and transportation of the wheel bearing or assembling of the wheel bearing apparatus to a vehicle. This causes problems not only with difficulties in handling, deterioration of assembling efficiency but also of a reduction of reliability in quality.

SUMMARY

It is, therefore, an object of the present disclosure to provide a wheel bearing apparatus that can solve the problems of above described prior art. Thus, it improves the durability of the wheel bearing apparatus while preventing entry of rain water, dust etc. into the fitting portion between the outer member of the wheel bearing apparatus and the knuckle.

To achieve the above mentioned object, a wheel bearing apparatus comprises an outer member integrally formed, on its outer circumference, with a body mounting flange to be mounted on a knuckle. The outer member inner circumference includes double row outer raceway surfaces. An inner member includes a wheel hub. The wheel hub outer circumference includes double row inner raceway surfaces opposing the double row outer raceway surfaces. The wheel hub is integrally formed, on its one end, with a wheel mounting flange. An axial cylindrical portion extends from the wheel mounting flange. Double row rolling elements are contained between the inner raceway surfaces of the inner member and outer raceway surfaces of the outer member, via cages. A cylindrical pilot portion, adapted to fit into the knuckle, is formed on an inner-side end of the outer member. The pilot portion is formed by two guiding portions. It comprises a first guiding portion, formed at the side of inner-side end face of the outer member, and a second guiding portion, formed at the side of the body mounting flange of the outer member. A fitting width (A) of the first guiding portion, with the knuckle, is set larger than a fitting width (B) of the second guiding portion, with the knuckle (A>B). An outer diameter D1 of the first guiding portion is set smaller than an outer diameter D2 of the second guiding portion (D1<D2). A seal ring, adapted to elastically contact the inner circumference of the knuckle, is arranged on either one of the first guiding portion or the second guiding portion.

Wheel bearing apparatus of the first through fourth generations include an outer member integrally formed, on its outer circumference, with a body mounting flange to be mounted on a knuckle. The outer member inner circumference includes double row outer raceway surfaces. A cylindrical pilot portion, adapted to be fit into the knuckle, is formed on an inner-side end of the outer member. The pilot portion is formed by two guiding portions. A first guiding portion is formed at the side of the inner-side end face of the outer member. A second guiding portion is formed at the side of the body mounting flange of the outer member. A fitting width A of the first guiding portion with the knuckle is set larger than a fitting width B of the second guiding portion with the knuckle (A>B). An outer diameter D1 of the first guiding portion is set smaller than an outer diameter D2 of the second guiding portion (D1<D2). A seal ring, adapted to elastically contact the inner circumference of the knuckle, is arranged on either one of the first guiding portion or the second guiding portion. Thus, it is possible to fit the second guiding portion into the knuckle while being kept in a condition guided by the first guiding portion of the smaller diameter during insertion of the outer member. Accordingly, the axial center of the outer member can correspond to that of the knuckle and thus the inclination of them can be suppressed. Thus, it is possible to provide the wheel bearing apparatus that can prevent the seal ring and the knuckle from being damaged. This improves the sealability and durability while preventing entry of rain water etc. into the fitting portion between the knuckle and the outer member.

An inner diameter portion of the knuckle, adapted to be fit onto the pilot portion of the outer member, is formed by two inner diameter portions. A first inner diameter portion is at the side of the body mounting flange. A second inner diameter portion axially extends from the first inner diameter portion. The guiding clearance between the inner diameter portion of the knuckle and the pilot portion is larger at the side of the first guiding portion than at the side of the second guiding portion. This makes it possible to fit the second guiding portion into the knuckle while being guided by the first guiding portion of smaller diameter during insertion of the outer member. Accordingly, the axial center of the outer member can correspond to that of the knuckle and thus the inclination of them can be suppressed. Thus, it is possible to easily fit the outer member into the knuckle without causing damage to the seal ring and the knuckle.

A seal ring is mounted on a corner formed by the second guiding portion of the pilot portion and the body mounting flange. A chamfered portion is formed on the second inner diameter portion. The seal ring elastically contacts the chamfered portion.

An annular groove is formed on the outer circumference of the second guiding portion of the pilot portion. The seal ring is mounted in the annular groove and elastically contacts the second inner diameter portion of the knuckle.

The seal ring has a circular cross-section. The annular groove is formed with a substantially semicircular cross-section corresponding to the cross-section of the seal ring. This improves the seating stability of the seal ring in the annular groove and the sealability of the fitting portion between the knuckle and the outer member. In addition, it is possible to reduce the stress concentration in the annular groove due to notch effect. Thus, this improves the strength of the pilot portion.

The seal ring is formed with a substantially X-shaped cross-section. This makes it possible to set the interference of the seal ring substantially large. Thus, this improves the fitting portion between the knuckle and the outer member.

A seal is mounted in an inner-side opening of an annular space formed between the outer member and the inner member. The seal includes a metal core and a sealing member integrally adhered to the metal core, via vulcanized adhesion. The metal core includes a cylindrical fitting portion and a cylindrical portion. The cylindrical fitting portion is adapted to fit into or onto the pilot portion of the outer member. The cylindrical portion axially extends from the fitting portion. The cylindrical portion of the metal core forms the first guiding portion. The pilot portion forms the second guiding portion. The seal ring is integrally adhered to the outer circumference of the cylindrical portion via vulcanized adhesion. This makes it possible to seal the annular space opening formed between the outer member and the inner member. Also, it is possible to fit the pilot portion of the outer member into the knuckle while being guided by the first guiding portion of smaller diameter during insertion of the outer member. Accordingly, the axial center of the outer member can correspond to that of the knuckle and thus the inclination of them can be suppressed. Thus, it is possible to provide the wheel bearing apparatus that can prevent the seal ring and the knuckle from being damaged and improve sealability and durability while preventing entry of rain water etc. into the fitting portion between the knuckle and the outer member.

A seal is mounted in an inner-side opening of an annular space formed between the outer member and the inner member. The seal is formed as a pack seal including an annular sealing plate and a slinger oppositely arranged to each other. The sealing plate has a metal core and a sealing member integrally adhered to the metal core, via vulcanized adhesion. The metal core includes a fitting portion, a flange portion, cylindrical portion and a radial inner portion. The fitting portion is cylindrically double folded and adapted to be press-fit into the inner circumference of the pilot portion of the outer member. The flange portion is adapted to be close contact with the end face of the pilot portion. The cylindrical portion axially extends from the flange portion. The radially inner portion extends radially inward from the fitting portion. The sealing member includes side lips, inclined radially outward, and a grease lip, inclined toward the inside of the bearing. The slinger is formed with a substantially L-shaped cross-section. The slinger includes a cylindrical portion and a standing portion. The cylindrical portion is adapted to be press-fit onto the outer circumference of the inner member and to be in sliding contact with the grease lip via a predetermined radial interference. The standing portion is adapted to be in sliding contact with the side lips via a predetermined axial interference. The cylindrical portion of the metal core forms the first guiding portion. The pilot portion forms the second guiding portion. The seal ring is integrally adhered to the outer circumference of the cylindrical portion, via vulcanized adhesion. This makes it possible to improve the positioning accuracy of the seal and the sealability of the wheel bearing apparatus while suppressing dispersion of the interference.

A seal is mounted in an inner-side annular space opening formed between the outer member and the inner member. The seal is formed as an integrated seal including a metal core and a sealing member, integrally adhered to the metal core via vulcanized adhesion. The metal core includes a cylindrical fitting portion, a cylindrical portion, and a radial inner portion. The cylindrical fitting portion is adapted to be press-fit onto the smaller diameter portion formed on the pilot portion of the outer member. The cylindrical portion axially extends from the fitting portion and has a diameter smaller than that of the fitting portion. The sealing member includes radial lips adapted to be in sliding contact with the outer circumference of the inner member, via a predetermined radial interference. The cylindrical portion of the metal core forms the first guiding portion. The pilot portion forms the second guiding portion. The seal ring is integrally adhered to the outer circumference of the cylindrical portion via vulcanized adhesion.

A pulser ring is mounted on the inner member. The pulser ring includes a supporting annulus and a magnetic encoder. The supporting annulus is formed from a steel sheet with a cylindrical radially outer portion adapted to be press-fit onto the inner member. The magnetic encoder is integrally adhered on the radially outer portion, via vulcanized adhesion. A rotation speed sensor is arranged opposite to the magnetic encoder via the cylindrical portion of the metal core. The sensor is inserted into the knuckle until it abuts against the cylindrical portion of the metal core or is in position in close proximity. The metal core is press-formed of non-magnetic steel sheet. This makes it possible to obtain a desirable air gap between the rotation detecting sensor and the magnetic encoder. Thus, it is possible to improve the workability of assembling of the wheel bearing assembly by omitting complicated air gap adjustment. In addition, the inside of the wheel bearing can be sealed by the seal to improve sealability.

A cup-shaped cap is mounted on the pilot portion of the outer member. The cap includes a cylindrical fitting portion adapted to be press-fit into the inner circumference of the pilot portion of the outer member. A double folded flange portion extends radially outward from the fitting portion. The flange portion is adapted to be in close contact with the end face of the pilot portion. A cylindrical portion axially extends from the flange portion. A bottom portion extends radially inward from the cylindrical portion. The cylindrical portion of the cap forms the first guiding portion and the pilot portion forms the second guiding portion. The seal ring is integrally adhered to the outer circumference of the flange portion via vulcanized adhesion.

The wheel bearing apparatus of the present disclosure comprises an outer member integrally, formed on its outer circumference, with a body mounting flange to be mounted on a knuckle. The outer member inner circumference includes double row outer raceway surfaces. An inner member includes a wheel hub. The inner member outer circumference includes double row inner raceway surfaces that oppose the double row outer raceway surfaces. The wheel hub is integrally formed, on its one end, with a wheel mounting flange. A cylindrical portion axially extends from the wheel mounting flange. Double row rolling elements are contained between the inner raceway surfaces of the inner member and outer raceway surfaces of the outer member, via cages. A cylindrical pilot portion, adapted to be fit into the knuckle, is formed on an inner-side end of the outer member. The pilot portion is formed by two guiding portions. A first guiding portion is formed at the side of inner-side end face of the outer member. A second guiding portion is formed at the side of the body mounting flange of the outer member. A fitting width A of the first guiding portion, with the knuckle, is set larger than a fitting width B of the second guiding portion, with the knuckle (A>B). An outer diameter D1 of the first guiding portion is set smaller than an outer diameter D2 of the second guiding portion (D1<D2). A seal ring, adapted to elastically contact the inner circumference of the knuckle, is arranged on either one of the first guiding portion or the second guiding portion. Thus, it is possible to fit the second guiding portion into the knuckle while being guided by the first guiding portion of smaller diameter. Accordingly, the axial center of the outer member can correspond to that of the knuckle. Thus, the inclination between them can be suppressed. Thus, it is possible to provide the wheel bearing apparatus that can prevent the seal ring and the knuckle from being damaged and improve sealability and durability while preventing entry of rain water etc. into the fitting portion between the knuckle and the outer member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4(*a*), (*b*) and (*c*) are explanatory views of assembling steps of the outer member to the knuckle;

FIGS. 6(a) and (b) are partially enlarged views of modifications of FIG. 5(b);

DETAILED DESCRIPTION

One mode for carrying out the present disclosure is a wheel bearing apparatus including an outer member integrally formed, on its outer circumference, with a body mounting flange to be mounted on a knuckle. The outer member inner circumference includes double row outer raceway surfaces. An inner member includes a wheel hub and an inner ring. The wheel hub is integrally formed, on its one end, with a wheel mounting flange. One of the double row inner raceway surfaces is formed on the wheel hub. The double row inner raceway surface opposes one of the double row outer raceway surfaces. A cylindrical portion axially extends from the inner raceway surface. Double row rolling elements are contained between the inner raceway surfaces of the inner member and outer raceway surfaces of the outer member, via cages. A cylindrical pilot portion, adapted to be fit into the knuckle, is formed on an inner-side end of the outer member. The pilot portion is formed by two guiding portions. A first guiding portion is formed at the side of inner-side end face of the outer member. A second guiding portion is formed at the side of the body mounting flange of the outer member. A fitting width A of the first guiding portion with the knuckle is set larger than a fitting width B of the second guiding portion with the knuckle (A>B). An outer diameter D1 of the first guiding portion is set smaller than an outer diameter D2 of the second guiding portion (D1<D2). A seal ring, adapted to elastically contact the inner circumference of the knuckle, is arranged on either one of the first guiding portion or the second guiding portion.

Figure 1:
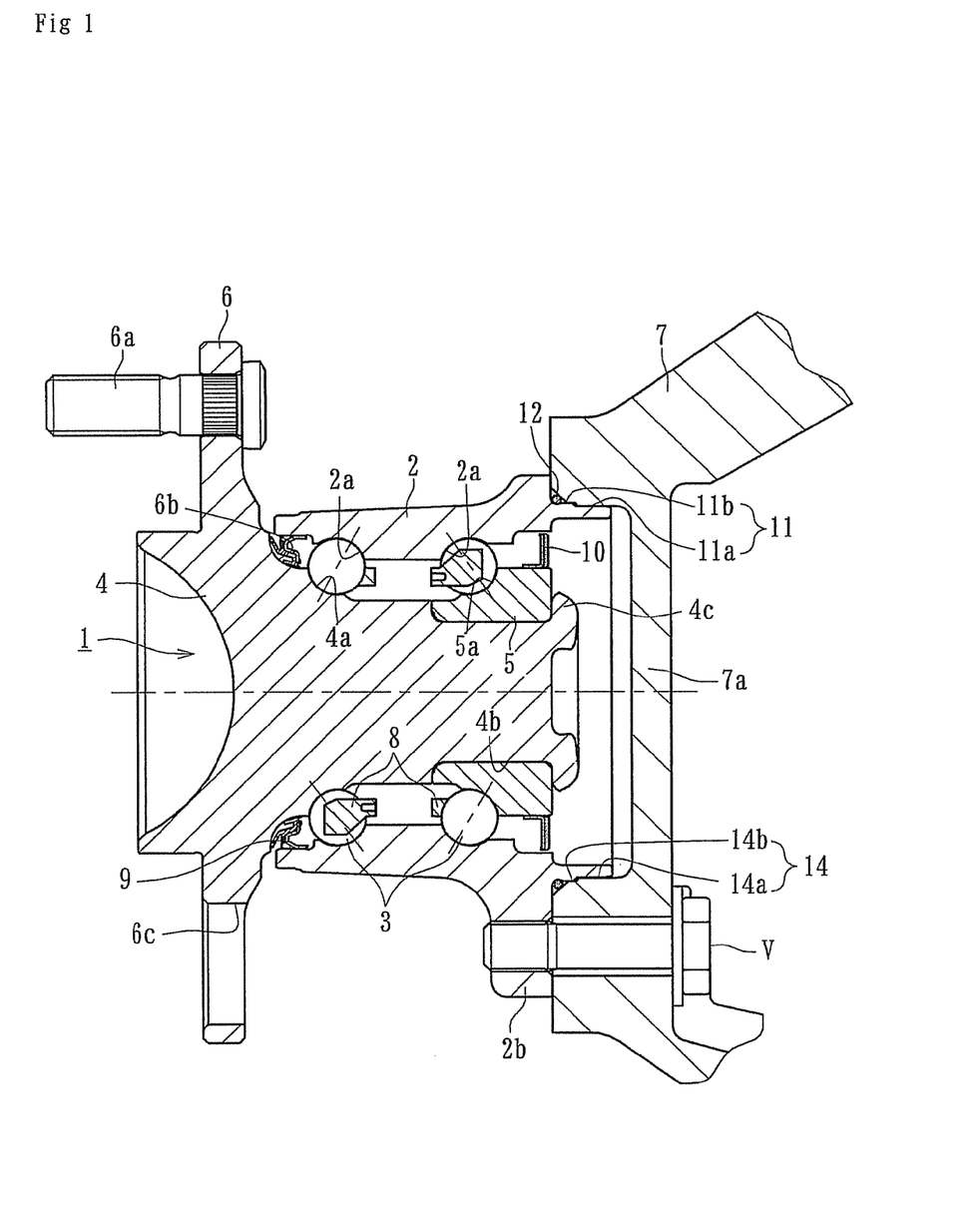
FIG. 1 is a longitudinal-section view of a first embodiment of a wheel bearing apparatus.
Figure 2:
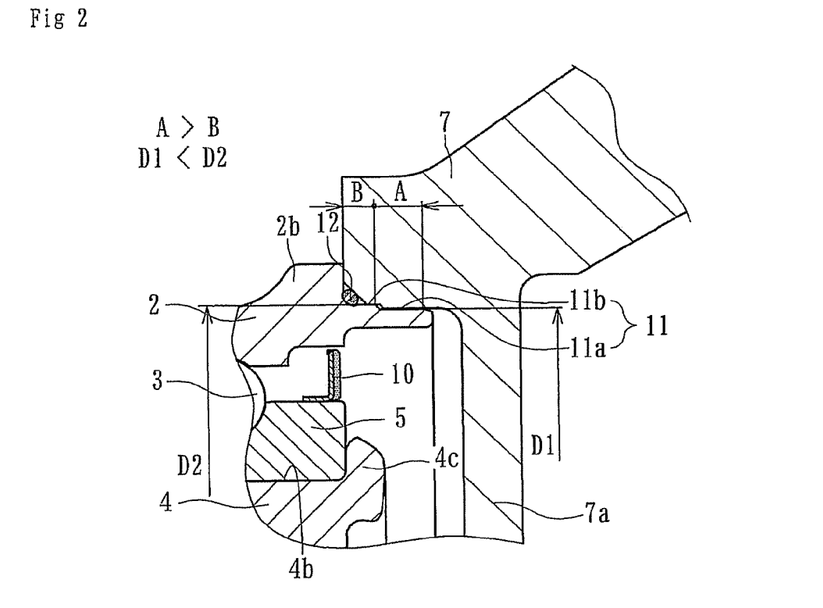
FIG. 2 is a partially enlarged view of FIG. 1.
Figure 3:
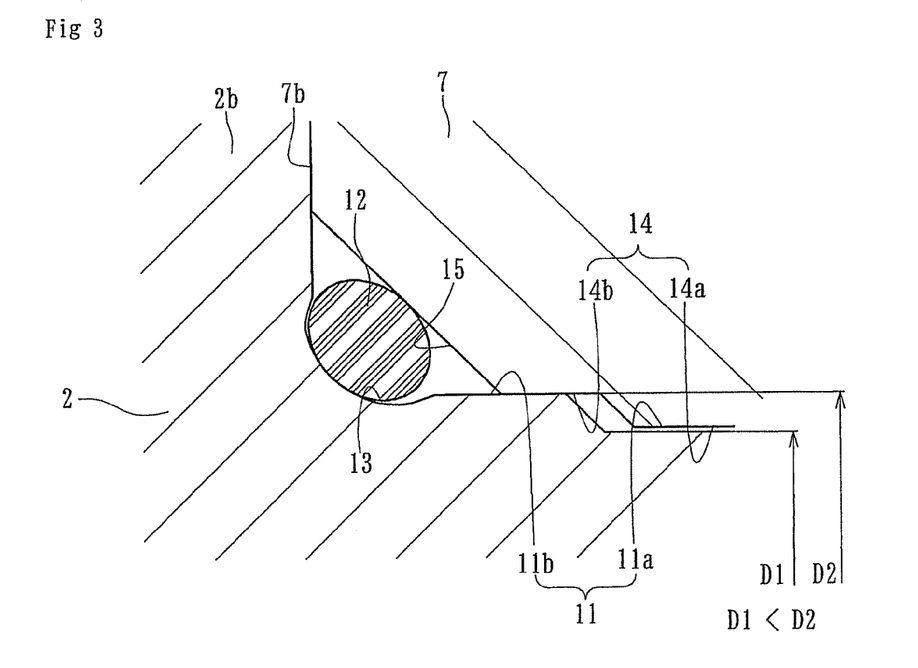
FIG. 3 is a partially enlarged view of FIG. 2.
Figure 4:
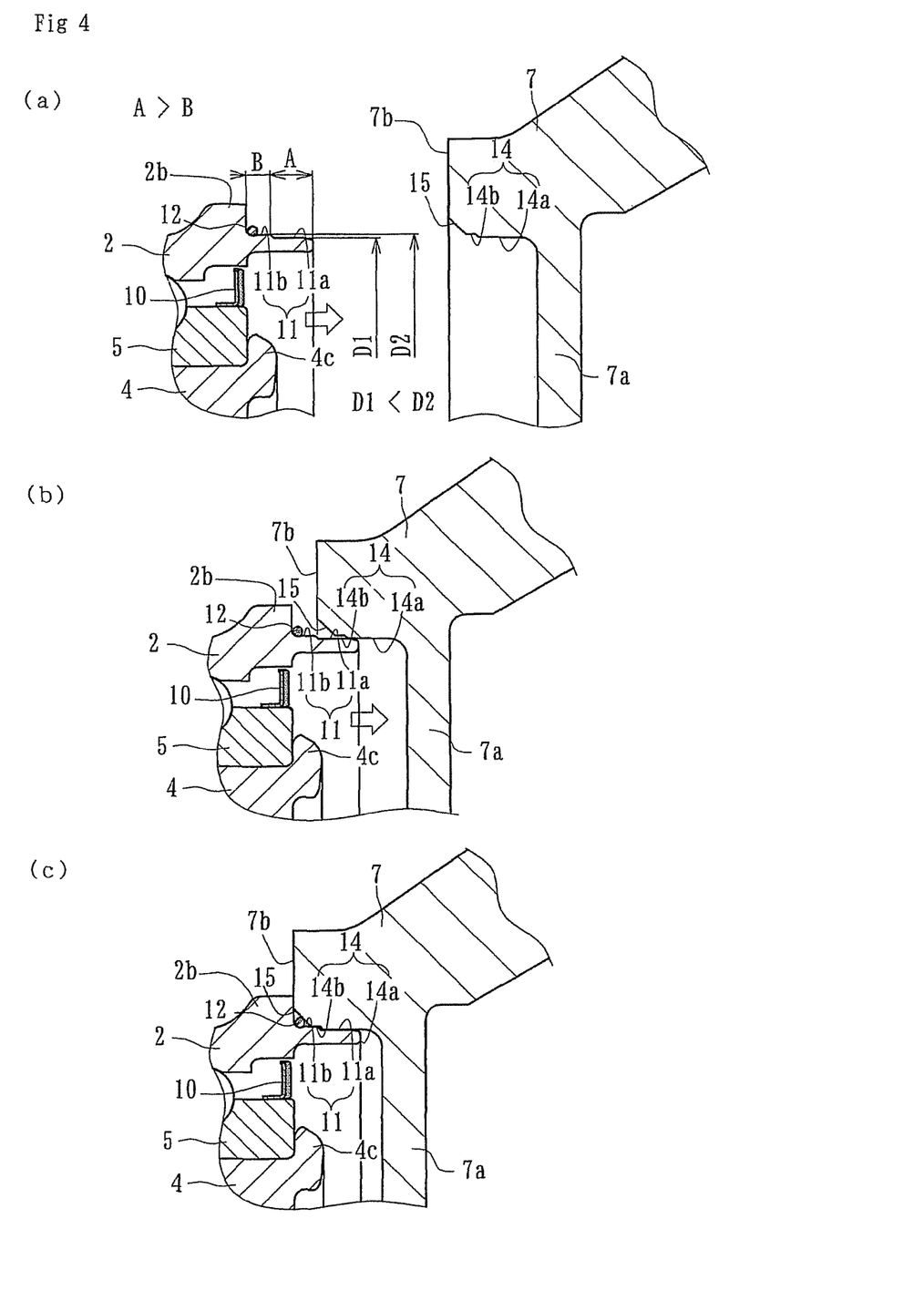
Figure 5:
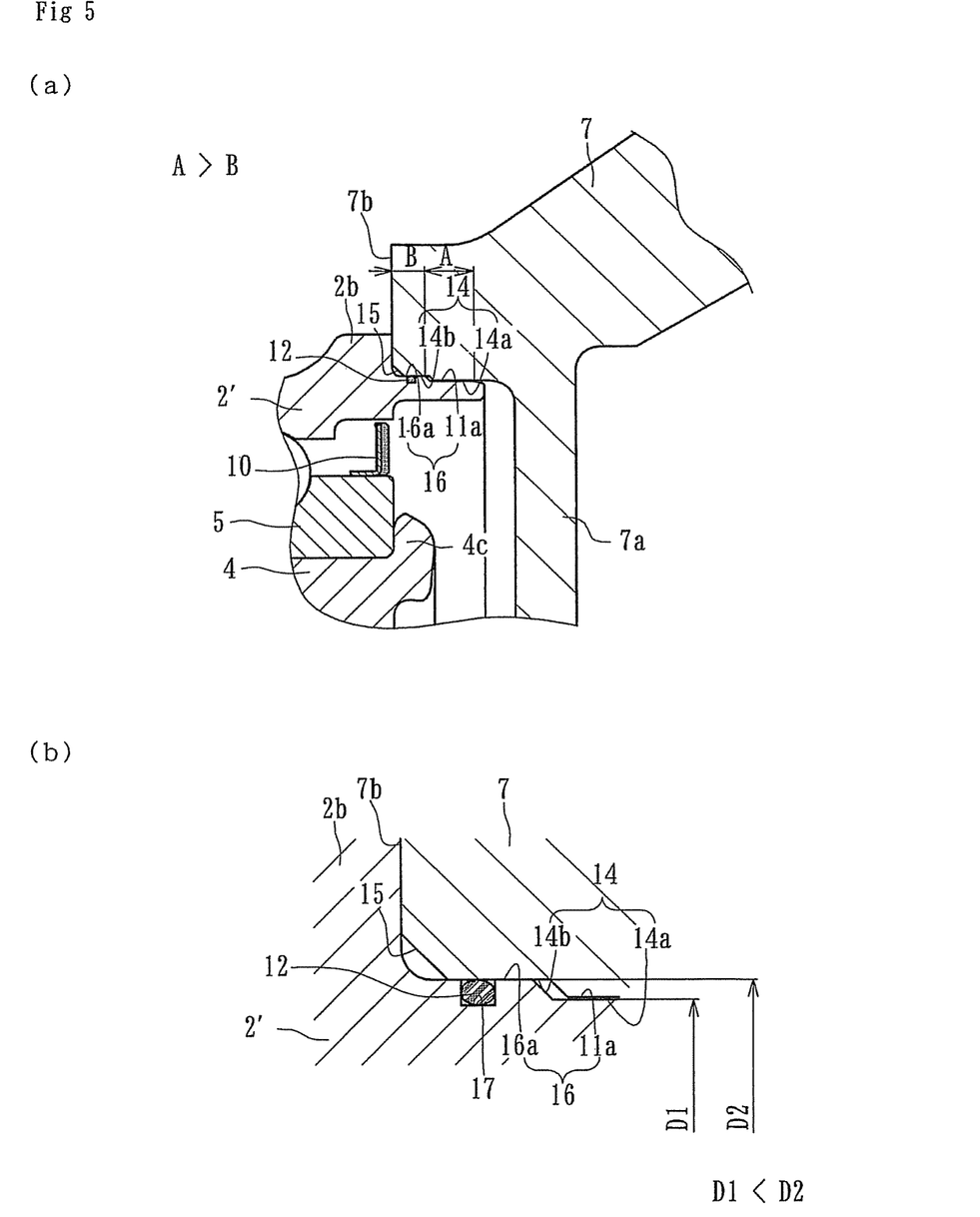
FIG. 5(a) is a partially enlarged view of a modification of FIG. 2.
FIG. 5(b) is a partially enlarged view of 5(a)
Figure 6:
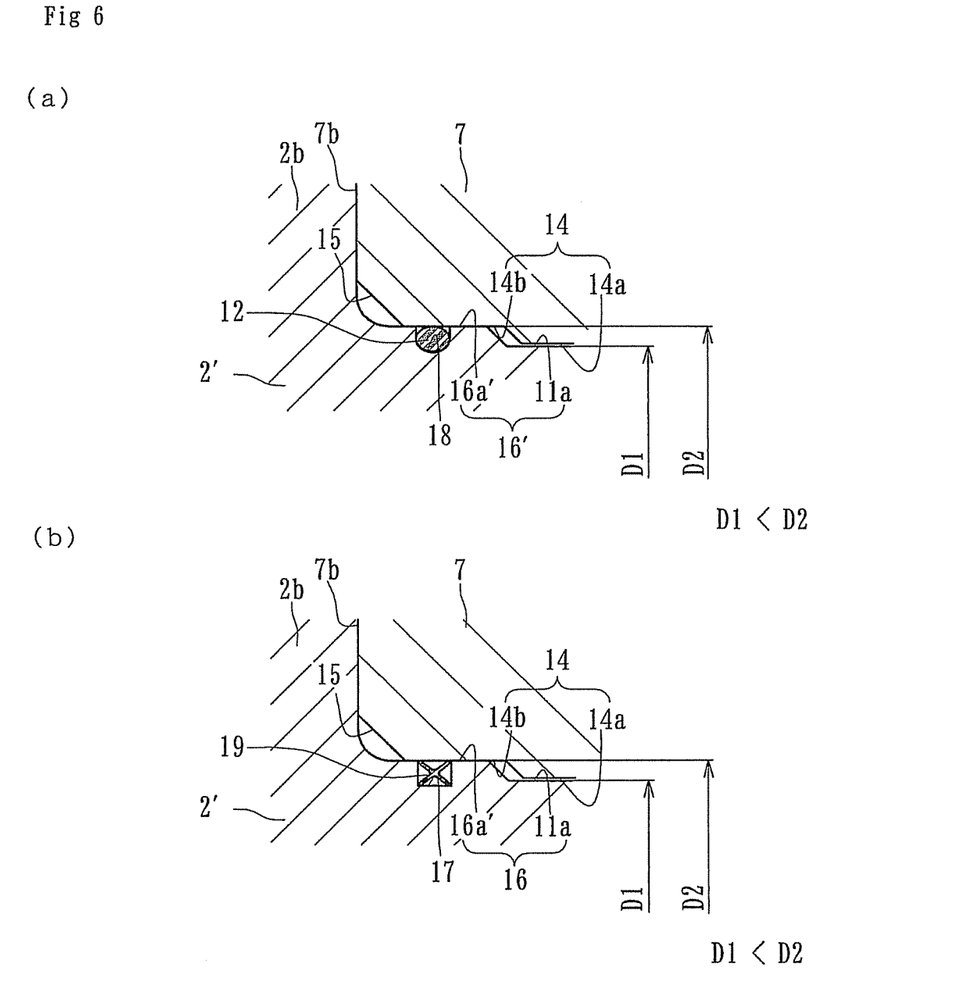

A preferred embodiment will be described with reference to the accompanied drawings. FIG. 1 is a longitudinal-section view of a first embodiment of a wheel bearing apparatus. FIG. 2 is a partially enlarged view of FIG. 1. FIG. 3 is a partially enlarged view of FIG. 2. FIGS. 4(a), (b) and (c) are explanatory views of assembling steps of the outer member to the knuckle. FIG. 5(a) is a partially enlarged view of a modification of FIG. 2. FIG. 5(b) is a partially enlarged view of FIG. 5(a). FIGS. 6(a) and (b) are partially enlarged views of modifications of FIG. 5(b). In the description below, an outer-side of a bearing apparatus is referred to as the "outer-side" (the left in FIG. 1). An inner-side of a bearing apparatus is referred to as the "inner side" (the right in FIG. 1) when it is mounted on a vehicle.

The wheel bearing apparatus of FIG. 1 is a so-called "third generation" type for a driven wheel. It includes an inner member 1, an outer member 2, and double row rolling elements (balls) 3, 3 contained between the inner and outer members 1 and 2. The inner member 1 includes the wheel hub 4 and an inner ring 5 press-fit onto the wheel hub 4 via a predetermined interference.

The wheel hub 4 is integrally formed on its outer-side end with a wheel mount flange 6. The wheel mounting flange 6 mounts a wheel (not shown). The wheel hub outer circumference includes one (outer-side) inner raceway surface 4a. A cylindrical portion 4b axially extends from the inner raceway surface 4a. The wheel mount flange 6 has hub bolts 6a at circumferentially equidistant positions and circular apertures 6c are formed between the hub bolts 6a for weight reduction.

The inner ring 5 is formed, on its outer circumference, with the other (inner-side) inner raceway surface 5a. The inner ring 5 is press-fit onto the cylindrical portion 4b of the wheel hub 4 to form a double row angular contact ball bearing of the back-to-back duplex type. The inner ring 5 is axially secured on the wheel hub 4 by applying a predetermined bearing pre-pressure by a caulked portion 4c. The caulked portion 4c is formed by plastically deforming the end of the cylindrical portion 4b radially outward. The inner ring 5 and rolling elements 3, 3 are formed from high carbon chrome steel such as SUJ2 and are dip hardened to their cores to have a hardness of 58~64 HRC.

The wheel hub 4 is made of medium-high carbon steel such as S53C including carbon of 0.40~0.80% by weight. It is hardened by high frequency induction hardening to have a surface hardness of 58~64 HRC over the inner raceway surface 4a and a region from an inner-side base 6b of the wheel mounting flange 6 to the cylindrical portion 4b. The caulked portion 4c is not hardened and kept to hardness after forging. This applies a sufficient mechanical strength to the wheel mounting flange 6 against rotary bending. Also, it improves the anti-fretting strength of the cylindrical portion 4b fit by the inner ring 5 as well as carrying out smooth plastic machining of the caulking portion 4c without the generation of any micro-cracks.

The outer member 2 is formed on its outer circumference with a body mounting flange 2b adapted to be mounted on a knuckle 7. The outer member inner circumference includes double row outer raceway surfaces 2a, 2a that opposes the double row inner raceway surface 4a, 5a of the inner member 1. Double row rolling elements 3, 3 are contained between the outer and inner raceway surfaces and are rollably held by cages 8, 8. A seal 9 is mounted on the outer-side opening formed between the outer member 2 and the inner member 1. The seal prevents the entry of rain water or dust from the outside into the bearing. On the other hand, the inner-side opening is closed by a bottom portion 7a of the knuckle 7 to protect a pulser ring 10 mounted on the inner-side opening. Also, it prevents leakage of lubricating grease sealed within the bearing and entry of dust etc. into the inside of the wheel bearing.

The outer member 2 is formed of medium-high carbon steel such as S53C including carbon of 0.40~0.80% by weight. At least the double row outer raceway surfaces 2a, 2a are hardened by high frequency induction hardening to have surface hardness of 58~64 HRC.

Although it is shown as a double row angular contact ball bearing using balls as the rolling elements 3, the present apparatus is not limited to such a bearing and may be applied to a double row tapered roller bearing using tapered rollers as the rolling elements 3. In addition, the present disclosure may be applied not only to a third generation structure but also to a second generation structure, where a pair of inner rings are press-fit on the wheel hub, and to fourth generation structures, where the wheel hub and the outer joint member of the constant velocity universal joint are included in the inner member.

In this embodiment, the knuckle 7 is integrally formed with a bottom portion 7a. The bottom portion 7a functions as a lid or cover to close the inner-side opening of the outer member 2. The outer member 2 is formed on the outer circumference of the inner-side end of the outer member 2 with a pilot portion 11. The pilot portion 11 is adapted to be fit into the knuckle 7. The outer member 2 can be integrally secured to the knuckle 7 by fastening bolts V from the inside of the knuckle. As shown in FIG. 2, a seal ring 12, such as O-ring etc., is interposed in the fit portion between the knuckle 7 and the pilot portion 11 of the outer member 2.

This seal ring 12 is formed of NBR (acrylonitrile-butadiene rubber) and its permanent compression strain of the physical property value of rubber is set at 40% or less at 120° C.×70 hour. Its TR 10 value (extension ratio: 50%) is set at −20° C. or less. Here, "TR 10 value" means recovery of strain of rubber in the low temperature region and substantially corresponds to degree of recovery of the rubber elasticity ("TR" is abbreviation of "Temperature Retraction"). There are examples of materials of the sealing ring 12 other than NBR, such as HNBR (hydrogenation acrylonitrile-butadiene rubber), EPDM (ethylene propylene rubber), ACM (polyacrylic rubber) superior in heat resistance and chemical resistance, FKM (fluororubber) or silicone rubber.

In this embodiment, the pilot portion 11 of the outer member 2 is formed with two guiding portions. A first guiding portion 11a is formed at the side of inner-side end face of the outer member 2. A second guiding portion 11b is formed at the side of the body mounting flange 2b of the outer member 2. A fitting width A of the first guiding portion 11a with the knuckle 7 is set larger than a fitting width B of the second guiding portion 11b with the knuckle 7 (A>B). In addition as shown in an enlarged view of FIG. 3, an outer diameter D1 of the first guiding portion 11a is set smaller than an outer diameter D2 of the second guiding portion 11b (D1<D2). An annular groove 13 is formed on a corner formed by the second guiding portion 11b and the body mounting flange 2b. The seal ring 12 is received in the annular groove 13.

An inner diameter portion 14 of the knuckle 7, adapted to be fit onto the pilot portion 11 of the outer member 2, is formed with two inner diameter portions. A first inner diameter portion 14a is at the side of the bottom portion 7a. A second inner diameter portion 14b is at the side of the end face 7b. A chamfered portion 15 is formed on the second inner diameter portion 14a to elastically contact the seal ring 12. Furthermore, the guiding clearance between the inner diameter portion 14 of the knuckle 7 and the pilot portion 11 of the outer member 2 is set larger at the side of the first guiding portion 11a than at the side of the second guiding portion 11b. More particularly, the guiding clearance is set at 0.30 mm or less (in diameter) at the side of the first guiding portion 11a and at 0.10 mm or less (in diameter) at the side of the second guiding portion 11b. This makes it possible to fit the second guiding portion 11b into knuckle 7 while being guided by the first guiding portion 11a of the smaller diameter during insertion of the outer member 2. Accordingly, the axial center of the outer member 2 can correspond to that of the knuckle 7. Thus, the inclination between them can be suppressed. Thus, it is possible to easily fit the outer member 2 into the knuckle 7 without causing damages on them.

Steps of assembling the outer member 2 to the knuckle 7 will be described with reference to FIG. 4(a)-(c).

Firstly, the seal ring 12 is mounted in the annular groove 13 (FIG. 3) in the pilot portion 11 of the outer member 2 as shown in FIG. 4(a). As shown in FIG. 4(b), the first guiding portion 11a of the pilot portion 11 is inserted into the first inner diameter portion 14a of the knuckle 7. The second guiding portion 11b is inserted into the second inner diameter portion 14b until the end face 7b of the knuckle 7 abuts against the side surface of the body mounting flange 2b of the outer member 2 while keeping a condition guided by the first guiding portion 11a of the smaller diameter (FIG. 4(c)).

According to the present disclosure, the pilot portion 11 of the outer member 2 is formed by two guiding portions, the first guiding portion 11a and the second guiding portion 11b. The fitting width A of the first guiding portion 11a with the knuckle 7 is set larger than a fitting width B of the second guiding portion 11b with the knuckle 7 (A>B). The guiding clearance relative to the knuckle 7 at the side of the first guiding portion 11a is set larger than that at the side of the second guiding portion 11b. Thus, it is possible to fit the second guiding portion 11b into the knuckle 7 while being guided by the first guiding portion 11a of smaller diameter during insertion of the outer member 2. Accordingly, the axial center of the outer member 2 can correspond to that of the knuckle 7. Thus, the inclination between them can be suppressed. Thus, it is possible to provide a wheel bearing apparatus that prevents the seal ring 12 and the knuckle 7 from being damaged. Also, it improves sealability and durability while preventing entry of rain water etc. into the fitting portion between the knuckle 7 and the outer member 2.

FIG. 5(a) shows a modification of the previous embodiment shown in FIGS. 1, 2 and 3. In this modification, the pilot portion 16 of the outer member 2' is formed by two guiding portions. The first guiding portion 11a is at the side of the end face of the outer member 2'. The second guiding portion 16a is at the side of the body mounting flange 2b. The fitting width A of the first guiding portion 11a with the knuckle 7 is set larger than a fitting width B of the second guiding portion 16a with the knuckle 7 (A>B). In addition, as shown in the enlarged view of FIG. 5(b), the outer diameter D1 of the first guiding portion 11a is set smaller than the outer diameter D2 of the second guiding portion 16a (D1<D2). An annular groove 17 is formed on the outer circumference of the second guiding portion 16a. The seal ring 12 is received in the annular groove 17.

An inner diameter portion 14 of the knuckle 7, adapted to be fit onto the pilot portion 16 of the outer member 2', is formed by two inner diameter portions. A first inner diameter portion 14a is at the side of the bottom portion 7a of the knuckle 7. A second inner diameter portion 14b is at the side of the end face 7b of the knuckle 7. The second inner diameter portion 14b is elastically contacted by the seal ring 12. Furthermore, the guiding clearance between the inner diameter portion 14 of the knuckle 7 and the pilot portion 16 of the outer member 2' is set larger at the side of the first guiding portion 11a than that at the side of the second guiding portion 16a. Similarly to the previous embodiment, this makes it possible to fit the second guiding portion 16a into the knuckle 7 while being guided by the first guiding portion 11a of smaller diameter during insertion of the outer member 2. Accordingly, the axial center of the outer member 2 can correspond to that of the knuckle 7. Thus, the inclination between them can be suppressed. Thus, it is possible to easily fit the outer member 2 into the knuckle 7 without causing damages to them. Thus, this prevents rain water etc. from entry into the fitting portion between the knuckle 7 and the outer member 2.

FIGS. 6(a) and (b) show modifications of FIG. 5(b). In the modification of FIG. 6(a), the cross-section of an annular groove 18 formed on the outer circumference of the second guiding portion 16a' is different from that of the annular groove 17 of FIG. 5(b). That is, the annular groove 18 is formed with a substantially semicircular cross-section corresponding to the cross-section of the seal ring 12, having a circular cross-section. This makes it possible to improve the seating stability of the seal ring 12 in the annular groove 18. Thus, this improves the sealability of the fitting portion between the knuckle 7 and the outer member 2. In addition, it is possible to reduce the stress concentration in the annular groove 18 due to notch effect and thus improve the strength of the pilot portion 16'.

The modification of FIG. 6(b) is different from that of FIG. 5(b) only in the configuration of a seal ring 19. The seal ring 19 is formed with a substantially X-shaped cross-section. This makes it possible to set the interference of the seal ring 19 substantially large. Thus, this improves the fitting portion between the knuckle 7 and the outer member 2.

Figure 7:
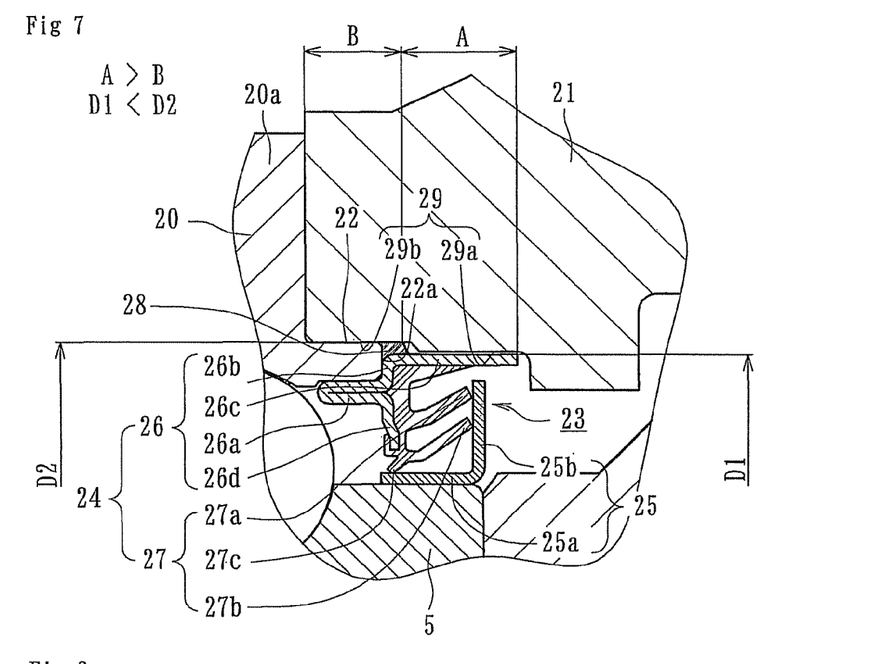
FIG. 7 is a partially enlarged view of a second embodiment of a wheel bearing apparatus.

FIG. 7 is a partially enlarged view of a second embodiment of a wheel bearing apparatus. The same reference numerals as those used in the previous embodiment and modifications are used to designate the same structural element and its detailed description will be omitted.

An outer member 20 is formed of medium-high carbon steel such as S53C including carbon of 0.40~0.80% by weight. It is formed on its outer circumference with a body mount flange 20a adapted to be mounted on a knuckle 21. The outer member inner circumference includes double row outer raceway surfaces 2a, 2a. The outer member outer circumference of the inner-side end includes a pilot portion 22 adapted to be fit into the knuckle 21.

A seal 23 is mounted in an inner-side annular space opening formed between the outer member 20 and inner ring 5. This seal 23 is formed as a combined seal (so-called pack seal) with an annular sealing plate 24 and a slinger 25, which are arranged opposite to each other. The sealing plate 24 has a metal core 26 mounted on the pilot portion 22 of the outer member 20. A sealing member 27 is integrally adhered to the metal core 26 via vulcanized adhesion.

The metal core 26 is press-formed of preservative steel sheet such as austenitic stainless steel sheet (JIS SUS 304 etc.) or preserved cold rolled steel sheet (JIS SPCC etc.). The metal core 26 includes a fitting portion 26a, a flange portion 26b, a cylindrical portion 26c and a radially inner portion 26d. The fitting portion 26a is a double folded cylinder adapted to be press-fit into the inner circumference of the pilot portion 22 of the outer member 20. The flange portion 26b is adapted to be in close contact with the end face 22a of the pilot portion 22. The cylindrical portion (first guiding portion) 26c axially extends from the flange portion 26b. The radially inner portion 26d extends radially inward from the fitting portion 26a. This improves the positioning accuracy of the seal 23 and sealability of the wheel bearing apparatus while suppressing dispersion of the interference.

The seal member 27 is formed of synthetic resin such as NBR. It includes first and second side lips 27a, 27b, inclined radially outward, and a grease lip 27c. The grease lip 27c is inclined toward the inside of the bearing at a radially inner position from the first and second side lips 27a, 27b. There are example of materials of the sealing member 27 other than NBR, e.g. such as HNBR, EPM, EPDM, ACM, FKM or silicone rubber.

The slinger 25 is formed with a substantially L-shaped cross-section. The slinger 25 has a cylindrical portion 25a and a standing portion 25b. The cylindrical portion 25a is adapted to be press-fit onto the outer circumference of the inner ring 5. The standing portion 25b extends radially outward from the cylindrical portion 25a. The first and second side lips 27a, 27b of the sealing member 27 are in sliding contact with the standing portion 25b of the slinger 25, via a predetermined axial interference. The grease lip 27c is in sliding contact with the cylindrical portion 25a, via a predetermined radial interference.

In this embodiment, the cylindrical portion 26c of the metal core 26, forming the seal 23, forms the first guiding portion of the previous embodiment. The seal ring 28 is integrally adhered to the outer circumference of the cylindrical portion 26c, via vulcanized adhesion.

The inner diameter portion 29 of the knuckle 21, adapted to be fit with the pilot portion 22 of the outer member 20, is formed by two inner diameter portions. A second inner diameter portion 29b of the end face side of the knuckle 21 is adapted to be in contact with the seal ring 28. A first inner diameter portion 29a axially extends from the second inner diameter portion 29b and has a diameter smaller than that of the second inner diameter 29b. The fitting width A of the cylindrical portion 26c (forming the first guiding portion) of the metal core 26 with the knuckle 21 is set larger than the fitting width B of the pilot portion 22 (forming the second guiding portion) with the knuckle 21 (A>B). In addition, the guiding clearance at the side of the cylindrical portion 26c of the metal core 26 is set larger than that between the inner diameter portion 29 of the knuckle 21 and the pilot portion 22 of the outer member 20.

The seal 23 of such a structure seals the annular space opening of the annular space formed between the outer member 20 and the inner ring 5. In addition, similar to the previous embodiment, it is possible to fit the pilot portion 22 of the outer member 20 into the inner diameter portion 29 of the knuckle 21 under a condition guided by the cylindrical portion 26c of the metal core 26 at the side of a smaller diameter during insertion of the outer member 20. Accordingly, the axial center of the outer member 20 can correspond to that of the knuckle 21. Thus, the inclination between them can be suppressed. Thus, it is possible to prevent the seal ring 28 and the knuckle 21 from being damaged. Thus, this improves the sealability and durability while preventing entry of rain water etc. into the fitting portion between the knuckle 21 and the outer member 20.

Figure 8:
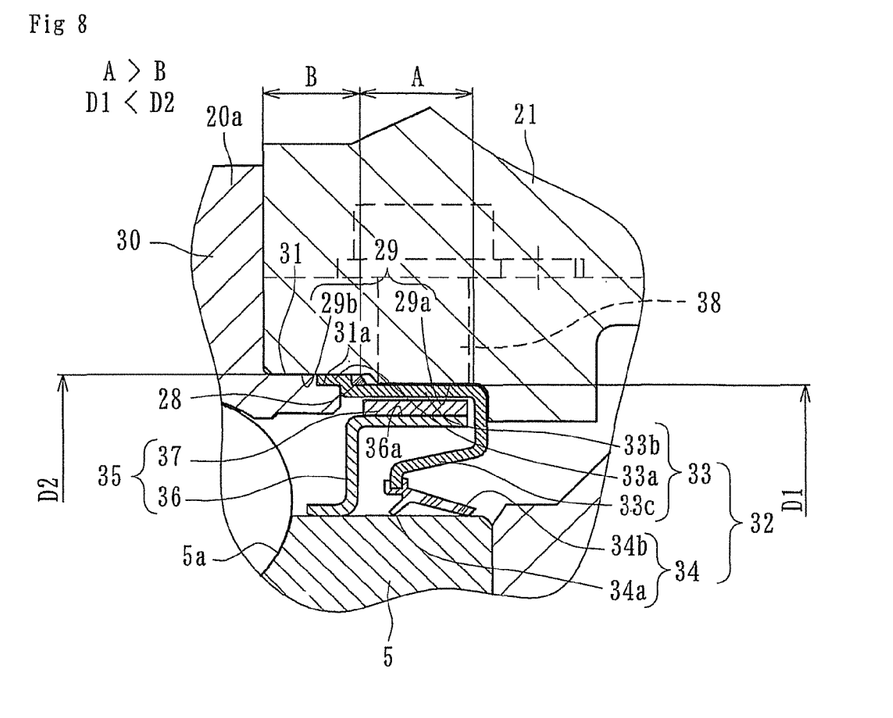
FIG. 8 is a partially enlarged view of a third embodiment of a wheel bearing apparatus.

FIG. 8 is a partially enlarged view of a third embodiment of a wheel bearing apparatus. The same reference numerals as those used in the previous embodiments and modifications are used to designate the same structural element and its detailed description will be omitted.

An outer member 30 is formed of medium-high carbon steel such as S53C including carbon of 0.40~0.80% by weight. It is formed on its outer circumference with a body mount flange 20a adapted to be mounted on a knuckle 21. The outer member inner circumference includes double row outer raceway surfaces 2a, 2a. The outer member outer circumference of the inner-side end includes a pilot portion 31 adapted to be fit into the knuckle 21.

A seal 32 is mounted in an inner-side annular space opening formed between the outer member 30 and inner ring 5. This seal 32 is formed as an integral seal including a metal core 33 mounted on a pilot portion 31 of the outer member 30. A sealing member 34 is adhered to the metal core 33, via vulcanized adhesion.

The metal core 33 is press-formed to have a substantially "C"-shaped cross-section from non-magnetic austenitic stainless steel sheet (JIS SUS 304 etc.) having anti-corrosion property and not giving any adverse effect on detecting performance of a rotation speed sensor 38 described below. The metal core 33 includes a cylindrical fitting portion 33a, a cylindrical portion 33b and a radially inner portion 33c. The cylindrical fitting portion 33a is adapted to be press-fit onto the outer circumference of a smaller outer diameter portion 31a formed on a pilot portion 31 of the outer member 30. The cylindrical portion (first guiding portion) 33b axially extends from the fitting portion 33a. The cylindrical portion 33b has a diameter smaller than the fitting portion 33a. The radially inner portion 33c extends radially inward from the cylindrical portion 33b.

The sealing member 34 is formed from synthetic resin such as NBR. It includes bifurcated radial lips 34a, 34b adapted to be in sliding contact with the outer circumference of the inner ring 5, via a predetermined radial interference. There are example of materials of the sealing member 34 other than NBR, e.g. such as HNBR, EPM, EPDM, ACM, FKM or silicone rubber.

A pulser ring 35 is mounted on the inner ring 5. The pulser ring 35 includes a supporting annulus 36 and a magnetic encoder 37. The supporting annulus is formed from a steel sheet with a cylindrical radially outer portion 36a adapted to be press-fit onto the inner member 1. The magnetic encoder 37 is integrally adhered on the radially outer portion 36a, via vulcanized adhesion. The magnetic encoder 37 is formed from elastomer such as rubber into which ferritic magnetic powder is mingled so that N and S poles are alternately arranged along its circumference to construct a rotary encoder to detect the rotation speed of a wheel.

The magnetic encoder 37 is arranged so that it opposes the rotation speed sensor 38 mounted in the knuckle 21 via the metal core 33 of the seal 32. The rotation speed sensor 38 is arranged opposite to the magnetic encoder 37 via the metal core 33. The rotational speed sensor 38 is inserted into the knuckle 21 until it abuts against the metal core 33 or is positioned in close proximity thereto. This makes it possible to obtain a desirable air gap between the rotation speed sensor 38 and the magnetic encoder 37. Thus, it is possible to improve the workability during assembling of the wheel bearing assembly by omitting complicated air gap adjustment. In addition, the inside of the wheel bearing can be sealed by the seal 32 to have improved sealability.

In this embodiment, the cylindrical portion 33b of the metal core 33, forming the seal 32, forms the first guiding portion of the previous embodiment. The seal ring 28 is integrally adhered to the outer circumference of the cylindrical portion 33b, via vulcanized adhesion. The fitting width A of the cylindrical portion 33b (forming the first guiding portion) of the metal core 33 with the knuckle 21 is set larger than the fitting width B of the pilot portion 31 (forming the second guiding portion) with the knuckle 21 (A>B). In addition, the guiding clearance at the side of the cylindrical portion 33b of the metal core 33 is set larger than that between the inner diameter portion 29 of the knuckle 21 and the pilot portion 31 of the outer member 30.

Similar to the previous embodiment, such a structure makes it possible to fit the pilot portion 31 of the outer member 30 into the inner diameter portion 29 of the knuckle 21 under a condition where it is guided by the cylindrical portion 33b of the metal core 33 at the side of a smaller diameter during insertion of the outer member 30. Accordingly, the axial center of the outer member 30 can correspond to that of the knuckle 21. Thus, the inclination between them can be suppressed. Thus, it is possible to prevent the seal ring 28 and the knuckle 21 from being damaged. Also, it is possible to improve the sealability and durability while preventing entry of rain water etc. into the fitting portion between the knuckle 21 and the outer member 30.

Figure 9:
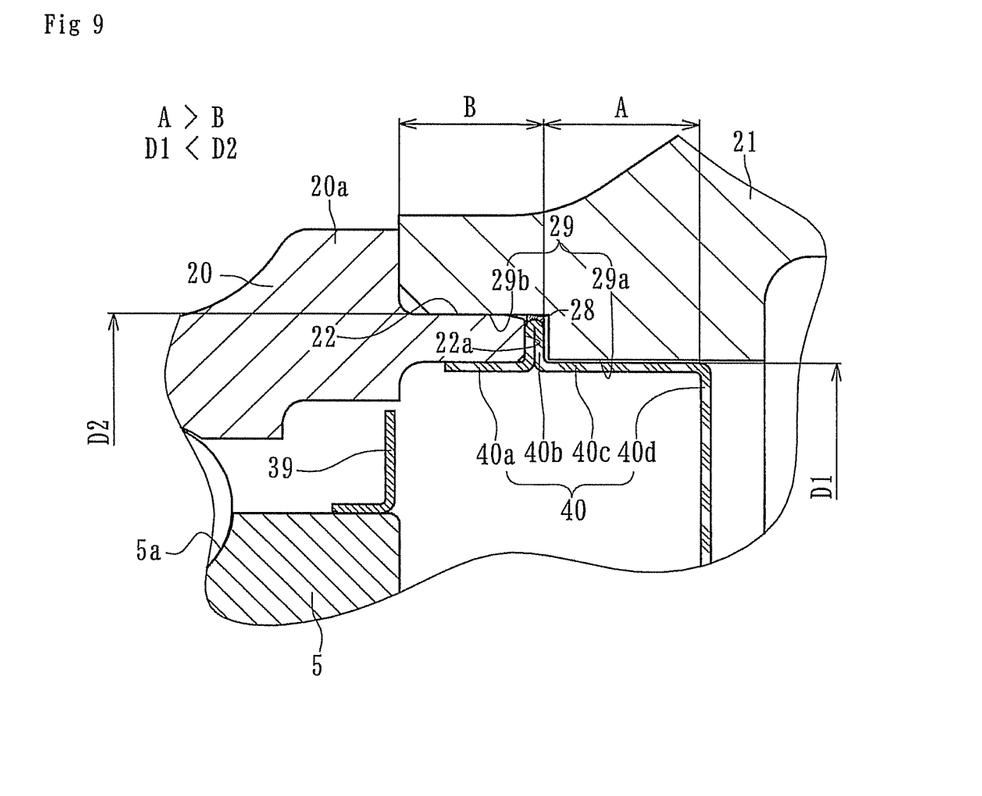
FIG. 9 is a partially enlarged view of a fourth embodiment of a wheel bearing apparatus.

FIG. 9 is a partially enlarged view of a fourth embodiment of a wheel bearing apparatus. The same reference numerals as those used in the previous embodiments and modifications are used to designate the same structural elements and their detailed description will be omitted.

In this embodiment, a shielding plate 39, formed from a steel sheet with a substantially "L"-shaped cross-section, is press-fit onto the outer circumference of the inner ring 5. A cap 40 is mounted on the pilot portion 22 of the outer member 20 to close the opening of the outer member 20. The cap 40 is press-formed from preservative steel sheet such as austenitic stainless steel sheet (JIS SUS 304 etc.) or preserved cold rolled steel sheet (JIS SPCC etc.). The cap 40 has a cup-shaped configuration and includes a cylindrical fitting portion 40a, a flange portion 40b, a cylindrical portion 40c and a bottom portion 40d. The cylindrical fitting portion 40a is adapted to be press-fit into the inner circumference of the pilot portion 22 of the outer member 20. The flange portion 40b extends radially outward from the fitting portion 40a and is double folded and adapted to be in close contact with the end face 22a of the pilot portion 22. The cylindrical portion (first guiding portion) 40c axially extends from the flange portion 40b. The bottom portion 40d extends radially inward from the cylindrical portion 40c.

In this embodiment, the cylindrical portion 40c of the cap 40 forms the first guiding portion of the previous embodiments. The seal ring 28 is integrally adhered to the outer circumference of the flange portion 40b via vulcanized adhesion. The fitting width A of the cylindrical portion 40c (forming the first guiding portion) of the cap 40 with the knuckle 21 is set larger than the fitting width B of the pilot portion 22 (forming the second guiding portion) with the knuckle 21 (A>B). In addition, the guiding clearance at the side of the cylindrical portion 40c of the cap 40 is set larger than that between the inner diameter portion 29 of the knuckle 21 and the pilot portion 22 of the outer member 20.

Similarly to the previous embodiment, such a structure makes it possible to fit the pilot portion 22 of the outer member 20 into the inner diameter portion 29 of the knuckle 21 under a condition where it is guided by the cylindrical portion 40c of the cap 40 during insertion of the outer member 20. Accordingly, the axial center of the outer member 20 can correspond to that of the knuckle 21. Thus, the inclination between them can be suppressed. Thus, it is possible to prevent the seal ring 28 and the knuckle 21 from being damaged. Also, it is possible to improve the sealability and durability while preventing entry of rain water etc. into the fitting portion between the knuckle 21 and the outer member 20.

The present disclosure can be applied to wheel bearing apparatus of the second generation type through the fourth generation type with the pilot portion at the inner side of the outer member fit into the knuckle irrespective of whether it is used for a driving wheel or a driven wheel.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:
1. A wheel bearing apparatus comprising:
an outer member integrally formed, on its outer circumference, with a body mounting flange to be mounted on a knuckle, the outer member inner circumference includes double row outer raceway surfaces;
an inner member, includes a wheel hub, the inner member outer circumferences include double row inner raceway surfaces opposite to the double row outer raceway surfaces, the wheel hub is integrally formed on its one end with a wheel mounting flange, a cylindrical portion axially extends from the wheel mounting flange;

double row rolling elements are contained between the inner raceway surfaces of the inner member and outer raceway surfaces of the outer member, via cages;

a cylindrical pilot portion, adapted to be fit into the knuckle, is formed on an inner-side end of the outer member, the pilot portion includes two guiding portions, a first guiding portion formed at the side of inner-side end face of the outer member and a second guiding portion formed at the side of the body mounting flange of the outer member;

a fitting width (A) of the first guiding portion for contacting with and to guide the knuckle is set larger than a fitting width (B) of the second guiding portion for contacting with and to guide the knuckle (A>B);

an outer diameter (D1) of the first guiding portion is set smaller than an outer diameter (D2) of the second guiding portion (D1<D2); and a seal ring, adapted to elastically contact the inner circumference of the knuckle, is arranged on either one of the first guiding portion or the second guiding portion.

2. The wheel bearing apparatus of claim 1, wherein an inner diameter portion of the knuckle, adapted to be fit onto the pilot portion of the outer member, is formed with two inner diameter portions, a first inner diameter portion is at the side of the body mounting flange and a second inner diameter portion axially extends from the first inner diameter portion, and a guiding clearance between the inner diameter portion of the knuckle and the pilot portion is larger at the side of the first guiding portion than at the side of the second guiding portion.

3. The wheel bearing apparatus of claim 1, wherein the seal ring is mounted on a corner formed by the second guiding portion of the pilot portion and the body mounting flange, and a chamfered portion is formed on the second inner diameter portion and the seal ring elastically contacts with the chamfered portion.

4. The wheel bearing apparatus of claim 1, wherein an annular groove is formed on the outer circumference of the second guiding portion of the pilot portion, and the seal ring is mounted in the annular groove and in elastic contact with a second inner diameter portion of the knuckle.

5. The wheel bearing apparatus of claim 4, wherein the seal ring has a circular cross-section and the annular groove is formed with a substantially semicircular cross-section corresponding to the cross-section of the seal ring.

6. The wheel bearing apparatus of claim 4, wherein the seal ring is formed with a substantially X-shaped cross-section.

7. The wheel bearing apparatus of claim 1, wherein a seal is mounted in an inner-side opening of an annular space formed between the outer member and the inner member, the seal includes a metal core and a sealing member integrally adhered to the metal core via vulcanized adhesion, the metal core including a cylindrical fitting portion and a cylindrical portion, the fitting portion is adapted to be fit into or onto the pilot portion of the outer member, the cylindrical portion axially extends from the fitting portion, the cylindrical portion of the metal core forms the first guiding portion and the pilot portion forms the second guiding portion, and the seal ring is integrally adhered to the outer circumference of the cylindrical portion via vulcanized adhesion.

8. The wheel bearing apparatus of claim 1, wherein a seal is mounted in an inner-side annular space opening formed between the outer member and the inner member, the seal is formed as a pack seal comprising an annular sealing plate and a slinger arranged opposite to each other, the sealing plate comprises a metal core and a sealing member integrally adhered to the metal core via vulcanized adhesion, the metal core comprises a fitting portion, a flange portion, a cylindrical portion and a radially inner portion, the fitting portion is cylindrically double folded and is adapted to be press-fit into the inner circumference of the pilot portion of the outer member, the flange portion is adapted to be in close contact with the end face of the pilot portion, the cylindrical portion axially extends from the flange portion, the radially inner portion extends radially inward from the fitting portion, the sealing member comprises side lips, inclined radially outward, and a grease lip, inclined toward the inside of the bearing, the slinger is formed with a substantially L-shaped cross-section and comprises a cylindrical portion and a standing portion, the cylindrical portion is adapted to be press-fit onto the outer circumference of the inner member and into sliding contact with the grease lip via a predetermined radial interference, the standing portion is adapted to be in sliding contact with the side lips via a predetermined axial interference, the cylindrical portion of the metal core forms the first guiding portion and the pilot portion forms the second guiding portion, and the seal ring is integrally adhered to the outer circumference of the cylindrical portion via vulcanized adhesion.

9. The wheel bearing apparatus of claim 1, wherein a seal is mounted in an inner-side annular space opening formed between the outer member and the inner member, the seal is formed as an integrated seal comprising a metal core and a sealing member integrally adhered to the metal core, via vulcanized adhesion, the metal core includes a cylindrical fitting portion, a cylindrical portion and a radially inner portion, the fitting portion is adapted to be press-fit onto the smaller diameter portion formed on the pilot portion of the outer member, the cylindrical portion axially extends from the fitting portion and has a diameter smaller than that of the fitting portion, the sealing member comprises radial lips adapted to be in sliding contact with the outer circumference of the inner member via a predetermined radial interference, the cylindrical portion of the metal core forms the first guiding portion and the pilot portion forms the second guiding portion, and the seal ring is integrally adhered to the outer circumference of the cylindrical portion via vulcanized adhesion.

10. The wheel bearing apparatus of claim 9, wherein a pulser ring is mounted on the inner member, the pulser ring comprises a support annulus and a magnetic encoder, the support annulus is formed from a steel sheet with a cylindrical radially outer portion adapted to be press-fit onto the inner member, the magnetic encoder is integrally adhered on the radially outer portion via vulcanized adhesion, a rotation speed sensor is arranged opposite to the magnetic encoder via the cylindrical portion of the metal core and the rotation speed sensor is inserted into the knuckle until it abuts against the cylindrical portion of the metal core or is positioned in close proximity, and the metal core is press-formed from a non-magnetic steel sheet.

11. The wheel bearing apparatus of claim 1, wherein a cup-shaped cap is mounted on the pilot portion of the outer member, the cap comprises a cylindrical fitting portion, a flange portion, a cylindrical portion and a bottom portion, the fitting portion is adapted to be press-fit into the inner circumference of the pilot portion of the outer member, the flange portion extends radially outward from the fitting portion and is double folded and adapted to be in close contact with the end face of the pilot portion, the cylindrical portion axially extends from the flange portion, the bottom portion extends radially inward from the cylindrical portion, the cylindrical portion of the cap forms the first guiding portion and the pilot portion forms the second guiding portion, and the seal ring is integrally adhered to the outer circumference of the flange portion via vulcanized adhesion.

12. A wheel bearing apparatus comprising:
an outer member integrally formed, on its outer circumference, with a body mounting flange to be mounted on a knuckle, the outer member inner circumference includes double row outer raceway surfaces;
an inner member, includes a wheel hub, the inner member outer circumferences include double row inner raceway surfaces opposite to the double row outer raceway surfaces, the wheel hub is integrally formed on its one end with a wheel mounting flange, a cylindrical portion axially extends from the wheel mounting flange;
double row rolling elements are contained between the inner raceway surfaces of the inner member and outer raceway surfaces of the outer member, via cages;
a cylindrical pilot portion, adapted to be fit into the knuckle, is formed on an inner-side end of the outer member, the pilot portion includes two guiding portions, a first guiding portion formed at the side of inner-side end face of the outer member and a second guiding portion formed at the side of the body mounting flange of the outer member;
a fitting width (A) of the first guiding portion with the knuckle is set larger than a fitting width (B) of the second guiding portion with the knuckle (A>B);
an outer diameter (D1) of the first guiding portion is set smaller than an outer diameter (D2) of the second guiding portion (D1<D2);
a seal ring, adapted to elastically contact the inner circumference of the knuckle, is arranged on either one of the first guiding portion or the second guiding portion; and
an inner diameter portion of the knuckle, adapted to be fit onto the pilot portion of the outer member, is formed with two inner diameter portions, a first inner diameter portion is at the side of the body mounting flange and a second inner diameter portion axially extends from the first inner diameter portion, and a guiding clearance between the inner diameter portion of the knuckle and the pilot portion is larger at the side of the first guiding portion than at the side of the second guiding portion.

13. A wheel bearing apparatus comprising:
an outer member integrally formed, on its outer circumference, with a body mounting flange to be mounted on a knuckle, the outer member inner circumference includes double row outer raceway surfaces;
an inner member, includes a wheel hub, the inner member outer circumferences include double row inner raceway surfaces opposite to the double row outer raceway surfaces, the wheel hub is integrally formed on its one end with a wheel mounting flange, a cylindrical portion axially extends from the wheel mounting flange;
double row rolling elements are contained between the inner raceway surfaces of the inner member and outer raceway surfaces of the outer member, via cages;
a cylindrical pilot portion, adapted to be fit into the knuckle, is formed on an inner-side end of the outer member, the pilot portion includes two guiding portions, a first guiding portion formed at the side of inner-side end face of the outer member and a second guiding portion formed at the side of the body mounting flange of the outer member;
a fitting width (A) of the first guiding portion with the knuckle is set larger than a fitting width (B) of the second guiding portion with the knuckle (A>B);
an outer diameter (D1) of the first guiding portion is set smaller than an outer diameter (D2) of the second guiding portion (D1<D2);
a seal ring, adapted to elastically contact the inner circumference of the knuckle, is arranged on either one of the first guiding portion or the second guiding portion; and
a seal is mounted in an inner-side opening of an annular space formed between the outer member and the inner member, the seal includes a metal core and a sealing member integrally adhered to the metal core via vulcanized adhesion, the metal core including a cylindrical fitting portion and a cylindrical portion, the fitting portion is adapted to be fit into or onto the pilot portion of the outer member, the cylindrical portion axially extends from the fitting portion, the cylindrical portion of the metal core forms the first guiding portion and the pilot portion forms the second guiding portion, and the seal ring is integrally adhered to the outer circumference of the cylindrical portion via vulcanized adhesion.

14. A wheel bearing apparatus comprising:
an outer member integrally formed, on its outer circumference, with a body mounting flange to be mounted on a knuckle, the outer member inner circumference includes double row outer raceway surfaces;
an inner member, includes a wheel hub, the inner member outer circumferences include double row inner raceway surfaces opposite to the double row outer raceway surfaces, the wheel hub is integrally formed on its one end with a wheel mounting flange, a cylindrical portion axially extends from the wheel mounting flange;
double row rolling elements are contained between the inner raceway surfaces of the inner member and outer raceway surfaces of the outer member, via cages;
a cylindrical pilot portion, adapted to be fit into the knuckle, is formed on an inner-side end of the outer member, the pilot portion includes two guiding portions, a first guiding portion formed at the side of inner-side end face of the outer member and a second guiding portion formed at the side of the body mounting flange of the outer member;
a fitting width (A) of the first guiding portion with the knuckle is set larger than a fitting width (B) of the second guiding portion with the knuckle (A>B);
an outer diameter (D1) of the first guiding portion is set smaller than an outer diameter (D2) of the second guiding portion (D1<D2);
a seal ring, adapted to elastically contact the inner circumference of the knuckle, is arranged on either one of the first guiding portion or the second guiding portion; and
a seal is mounted in an inner-side annular space opening formed between the outer member and the inner member, the seal is formed as a pack seal comprising an annular sealing plate and a slinger arranged opposite to each other, the sealing plate comprises a metal core and a sealing member integrally adhered to the metal core via vulcanized adhesion, the metal core comprises a fitting portion, a flange portion, a cylindrical portion and a radially inner portion, the fitting portion is cylindrically double folded and is adapted to be press-fit into the inner circumference of the pilot portion of the outer member, the flange portion is adapted to be in close contact with the end face of the pilot portion, the cylindrical portion axially extends from the flange portion, the radially inner portion extends radially inward from the fitting portion, the sealing member comprises side lips, inclined radially outward, and a grease lip, inclined toward the inside of the bearing, the slinger is formed with a substantially L-shaped cross-section and comprises a cylindrical portion and a standing portion, the cylindrical portion is adapted to be press-fit onto the outer circumference of the inner member and into sliding contact with the grease lip via a predetermined radial interference, the standing portion is adapted to be in sliding contact with the side lips via a predetermined axial interference, the cylindrical portion of the metal core forms the first guiding portion and the pilot portion forms the second guiding portion, and the seal ring is integrally adhered to the outer circumference of the cylindrical portion via vulcanized adhesion.

15. A wheel bearing apparatus comprising:

an outer member integrally formed, on its outer circumference, with a body mounting flange to be mounted on a knuckle, the outer member inner circumference includes double row outer raceway surfaces;

an inner member, includes a wheel hub, the inner member outer circumferences include double row inner raceway surfaces opposite to the double row outer raceway surfaces, the wheel hub is integrally formed on its one end with a wheel mounting flange, a cylindrical portion axially extends from the wheel mounting flange;

double row rolling elements are contained between the inner raceway surfaces of the inner member and outer raceway surfaces of the outer member, via cages;

a cylindrical pilot portion, adapted to be fit into the knuckle, is formed on an inner-side end of the outer member, the pilot portion includes two guiding portions, a first guiding portion formed at the side of inner-side end face of the outer member and a second guiding portion formed at the side of the body mounting flange of the outer member;

a fitting width (A) of the first guiding portion with the knuckle is set larger than a fitting width (B) of the second guiding portion with the knuckle (A>B);

an outer diameter (D1) of the first guiding portion is set smaller than an outer diameter (D2) of the second guiding portion (D1<D2);

a seal ring, adapted to elastically contact the inner circumference of the knuckle, is arranged on either one of the first guiding portion or the second guiding portion; and a seal is mounted in an inner-side annular space opening formed between the outer member and the inner member, the seal is formed as an integrated seal comprising a metal core and a sealing member integrally adhered to the metal core, via vulcanized adhesion, the metal core includes a cylindrical fitting portion, a cylindrical portion and a radially inner portion, the fitting portion is adapted to be press-fit onto the smaller diameter portion formed on the pilot portion of the outer member, the cylindrical portion axially extends from the fitting portion and has a diameter smaller than that of the fitting portion, the sealing member comprises radial lips adapted to be in sliding contact with the outer circumference of the inner member via a predetermined radial interference, the cylindrical portion of the metal core forms the first guiding portion and the pilot portion forms the second guiding portion, and the seal ring is integrally adhered to the outer circumference of the cylindrical portion via vulcanized adhesion.

16. A wheel bearing apparatus comprising:

an outer member integrally formed, on its outer circumference, with a body mounting flange to be mounted on a knuckle, the outer member inner circumference includes double row outer raceway surfaces;

an inner member, includes a wheel hub, the inner member outer circumferences include double row inner raceway surfaces opposite to the double row outer raceway surfaces, the wheel hub is integrally formed on its one end with a wheel mounting flange, a cylindrical portion axially extends from the wheel mounting flange;

double row rolling elements are contained between the inner raceway surfaces of the inner member and outer raceway surfaces of the outer member, via cages;

a cylindrical pilot portion, adapted to be fit into the knuckle, is formed on an inner-side end of the outer member, the pilot portion includes two guiding portions, a first guiding portion formed at the side of inner-side end face of the outer member and a second guiding portion formed at the side of the body mounting flange of the outer member;

a fitting width (A) of the first guiding portion with the knuckle is set larger than a fitting width (B) of the second guiding portion with the knuckle (A>B);

an outer diameter (D1) of the first guiding portion is set smaller than an outer diameter (D2) of the second guiding portion (D1<D2);

a seal ring, adapted to elastically contact the inner circumference of the knuckle, is arranged on either one of the first guiding portion or the second guiding portion; and a cup-shaped cap is mounted on the pilot portion of the outer member, the cap comprises a cylindrical fitting portion, a flange portion, a cylindrical portion and a bottom portion, the fitting portion is adapted to be press-fit into the inner circumference of the pilot portion of the outer member, the flange portion extends radially outward from the fitting portion and is double folded and adapted to be in close contact with the end face of the pilot portion, the cylindrical portion axially extends from the flange portion, the bottom portion extends radially inward from the cylindrical portion, the cylindrical portion of the cap forms the first guiding portion and the pilot portion forms the second guiding portion, and the seal ring is integrally adhered to the outer circumference of the flange portion via vulcanized adhesion.

* * * * *